US008060079B1

(12) United States Patent
Goyal et al.

(10) Patent No.: US 8,060,079 B1
(45) Date of Patent: Nov. 15, 2011

(54) MINIMUM LEAST SQUARES ERROR BASED ANALYSIS FOR THROUGHPUT-PRIORITIZED RADIO FREQUENCY PERFORMANCE OPTIMIZATION

(75) Inventors: Anoop Goyal, Overland Park, KS (US); Jong-Hak Jung, Herndon, VA (US); Hemanth Balaji Pawar, Overland Park, KS (US); Shilpa Kowdley Srinivas, Overland Park, KS (US); Gustavo Enrique Ulffe Whu, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1098 days.

(21) Appl. No.: 11/854,326

(22) Filed: Sep. 12, 2007

(51) Int. Cl.
*H04W 24/00* (2009.01)
*H04B 17/00* (2006.01)
(52) U.S. Cl. .................. 455/424; 455/423; 455/67.11
(58) Field of Classification Search .................. 370/352; 455/423, 424, 562.1, 446, 67.11
See application file for complete search history.

(56) References Cited

U.S. PATENT DOCUMENTS 6,646,987 B1    11/2003   Qaddoura
6,970,721 B1*   11/2005   Gnesda et al. ............. 455/562.1
2005/0064864 A1*  3/2005  Horton et al. ............... 455/423
2005/0265321 A1* 12/2005  Rappaport et al. .......... 370/352
2008/0004020 A1   1/2008  Yasuda

OTHER PUBLICATIONS

Balazinska et al., "Characterizing Mobility and Network Usage in a Corporate Wireless Local-Area Network", 2003, Proceedings of Mobisys 2003: The First International Conference on Mobile Systems, Applications, and Services, pp. 303-316.*
Boyer et al., "Application of Simulation and Mean Value Analysis to a Repair Facility Model for Finding Optimal Staffing Level", 2002, Proceedings of the 2002 Winter Simulation Conference, pp. 1871-1879.*

* cited by examiner

*Primary Examiner* — Jinsong Hu
*Assistant Examiner* — Opiribo Georgewill

(57) ABSTRACT

A method and system for prioritizing the optimization of sectors within a cellular network using the minimum least squares error ("MLSE") algorithm is presented. Each sector's throughput and performance metrics are collected over time. Problem sectors are having one or more performance metrics above or below a specified acceptable value are identified. A MLSE algorithm is applied to problem sectors to determine a weight per metric. Next, for each problem sector, the optimized throughput is calculated by substituting the value of a specific problem metric with an acceptable value. Problem sectors are prioritized in order of how much their throughput would improve as a result of an improvement to the problem metric.

16 Claims, 4 Drawing Sheets

MINIMUM LEAST SQUARES ERROR BASED ANALYSIS FOR THROUGHPUT-PRIORITIZED RADIO FREQUENCY PERFORMANCE OPTIMIZATION

FIELD OF THE INVENTION

The present invention relates to wireless communications and, more particularly, to prioritizing the optimization of sectors within a cellular network.

BACKGROUND

Cellular wireless is an increasingly popular means of personal communication in the modern world. People are using cellular wireless networks for the exchange of voice and data over cellular telephones, personal data assistants ("PDAs"), cellular modems, and other devices. In principle, a user can seek information over the Internet or call anyone over the Public Switched Telephone Network ("PSTN") from any place inside the coverage area of the cellular wireless network.

In a typical cellular wireless system, an area is divided geographically into a number of cell sites provided by a radio access network ("RAN"). The RAN typically comprises one or more base transceiver stations ("BTSs"), each of which has one or more antennas that radiate to define a radio frequency ("RF") radiation pattern. The BTS(s) of the RAN may then be coupled with a base station controller ("BSC") or radio network controller ("RNC"), which may in turn be coupled with a telecommunications switch or gateway, such as a mobile switching center ("MSC") or packet data serving node ("PDSN") for instance. The switch or gateway may then provide connectivity with a transport network, such as the PSTN or the Internet for instance.

When a mobile station (such as a cellular telephone, a wirelessly equipped PDA or personal computer, or another suitably equipped device) is positioned in a cell, the mobile station communicates via an RF air interface with the BTS of the cell. Consequently, a communication can be established between the mobile station and another entity, via the air interface and the RAN.

Most cells in a wireless network are usually further divided geographically into a number of sectors (which can be visualized ideally as pie pieces), each defined respectively by radiation patterns from directional antenna components of the respective BTS, or by respective BTS antennae.

SUMMARY

A cellular service provider may monitor and collect data on each sector's throughput (i.e., the amount of digital data per time unit that is delivered to mobile stations within the sector), and may also collect data on factors that affect the sector's throughput ("performance metrics"). These performance metrics allow the service provider to determine whether the sector is performing up to the provider's standards. For example, a service provider may monitor and collect data on the number of simultaneous connections within a sector. As another example, a service provider may monitor and collect data on the total amount of data transmitted through the sector. As another example, the service provider may collect data on the number of connection setup failures within the sector. If any of the performance metrics collected for particular sector is outside an acceptable range, the service provider may repair the sector in order to increase the sector's throughput.

Unfortunately, however, given the number of performance metrics that affect a sector's throughput, it is difficult to determine how much each performance metric affects the sector's throughput. In addition, because service providers typically maintain a substantial number of sectors, and several sectors may simultaneously require repair, it is difficult to determine which of the sectors would benefit most from a service improvement.

The present invention provides a method and system for prioritizing the optimization of sectors within a cellular network by using the minimum least squares error ("MLSE") algorithm. With the MLSE algorithm, it is possible to determine how much each performance metric contributes to the sector's throughput.

In an embodiment of the invention, each sector's throughput is collected over time. In addition, one or more performance metrics are collected over time for each sector. Next, problem sectors are identified that include one or more performance metrics above or below a specified acceptable value ("problem metrics"). For each identified problem sector, the MLSE algorithm is then applied to determine a weight per metric (i.e., the extent to which each metric factors into the sector's throughput). Next, for all problem sectors, given their determined weights, each sector's optimized throughput is calculated by substituting the value a specific problem metric with an acceptable value. For each identified problem sector, the optimized throughput is compared with the actual throughput to determine how much the sector's throughput would improve as a result of improvement to the problem metric ("predicted improvement level"). Next, the problem sectors are prioritized in order of predicted improvement levels. Finally, maintenance personnel are dispatched to repair sectors in order of predicted improvement levels.

In an alternate embodiment of the invention, problem sectors and problem metrics are identified by customer complaints. For each identified problem sector, the sector's throughput, identified problem metric, and other performance metrics are collected. Next, the MLSE algorithm is then applied to determine a weight per metric. Next, for each problem sector, given the determined weights, the sector's throughput improvement is calculated by substituting the value the problem metric identified by the customer with an acceptable value. Last, the problem sectors are prioritized in order of how much their throughput would improve as a result of an improvement to the problem metric.

These as well as other aspects and advantages will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
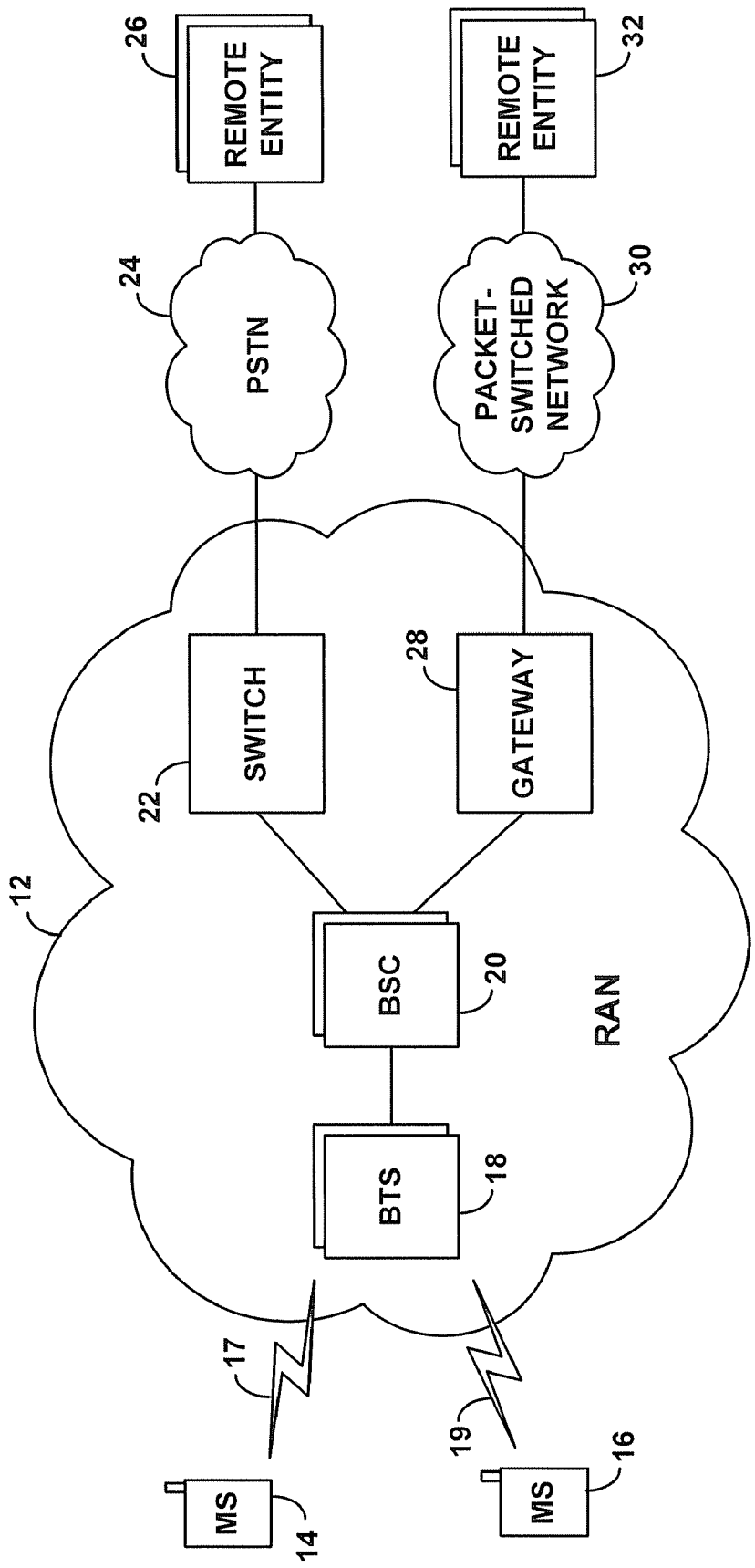
FIG. 1 is a simplified block diagram of a communication system for which an exemplary embodiment of the invention can be applied.

Referring to the drawings, FIG. 1 depicts a cellular communication system in which aspects of the exemplary embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, and/or hardware.

As shown in FIG. 1, the example communication system includes at its core a RAN 12 that is arranged to provide multiple mobile stations with wireless communication service. FIG. 1 depicts two representative mobile stations 14, 16 by way of example, either or each of which could be a cell phone, wirelessly equipped PDA, or other type of wirelessly-equipped device now known or later developed. Each mobile station is equipped with hardware, software, and/or other logic to communicate with RAN 12 in a known manner in accordance with an agreed communication protocol, such as CDMA (e.g., IS-95, IS-2000, 1xRTT, 1xEV-DO, etc.), iDEN, WiMAX, TDMA, AMPS, GSM, GPRS, UMTS, EDGE, or any other communication protocol now known or later developed.

RAN 12 defines a plurality of sectors (i.e., any wireless coverage areas established by reference to base station emissions or the like) in which mobile stations can communicate with the RAN. In particular FIG. 1 shows the RAN radiating to define two example sectors 17 and 19. The RAN may define these sectors discretely through use of directional antennas and/or by various modulation parameters, including, without limitation, carrier frequencies and PN offsets or other parameters, depending on the air interface protocol used.

The RAN can take various forms and may include any of a variety and number of components, depending for instance on the air interface protocol employed by the RAN. For example, the RAN may include one or more BTSs 18 and one or more BSCs 20 (also sometimes referred to as radio network controllers (RNCs)). The BTSs preferably include directional antennas, power amplifiers, and associated transceiver equipment arranged to establish the sectors shown and to communicate with served mobile stations.

In turn, each BSC 20 may control one or more BTSs and may manage aspects of air interface operation. For instance, a BSC may manage assignment of air interface traffic channels to mobile stations in response to mobile station origination messages. Further, the BSC may manage handoff of mobile stations between sectors, by engaging in control channel signaling such as that described above. In addition, the BSC may collect and analyze throughput and performance metric data for each sector defined by the RAN, in order to determine whether the sector is performing properly.

Each BSC may be coupled with a MSC or other switch 22 that provides connectivity with the PSTN 24 if applicable, so that served mobile stations can communicate with remote entities 26 on the PTSN. And each BSC may be coupled with a packet data serving node (PDSN) or other gateway 28 that provides connectivity with a packet-switched network 30 if applicable, so that served mobile stations can communicate with remote entities 32 on the packet-switched network.

Figure 2:
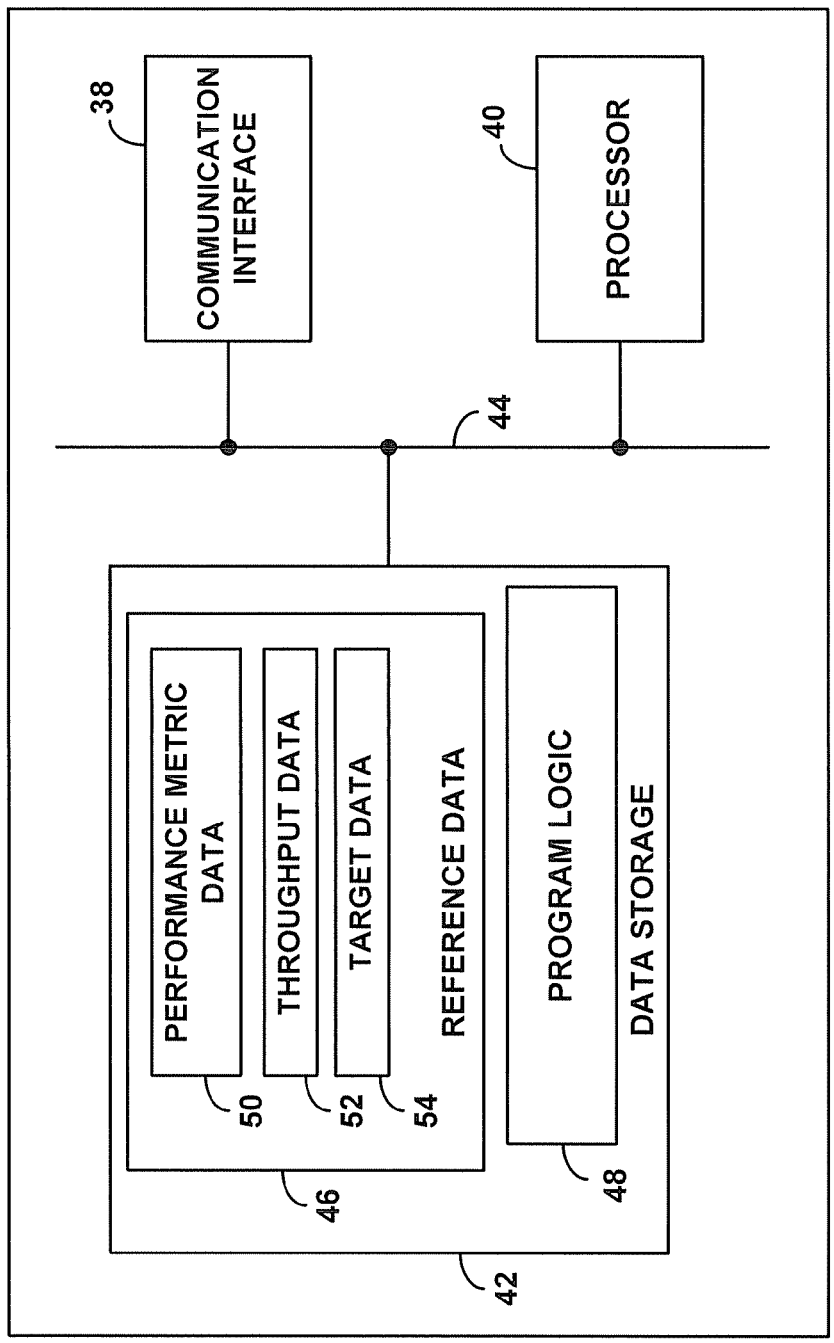
FIG. 2 is a simplified block diagram of an entity arranged to implement aspects of the exemplary embodiment.

Aspects of the present invention may be carried out by one or more entities shown in FIG. 1, or by one or more other entities. For instance, aspects may be carried out by BTS 18, BSC 20, by switch 22, and/or by some other entity (such as a controlling server (not shown) coupled with the various entities shown). FIG. 2 is a simplified block diagram depicting functional components of such an entity (e.g., combination of entities). As shown, the entity includes by way of example a communication interface 38, a processor 40, and data storage 42, coupled together by a system bus, network, or other connection mechanism 44.

Communication interface 38 may include one or more communication interface mechanisms that enable the entity to communicate with various other entities. As such, the communication interface may take various well known forms, depending factors such as the type of communication links in use. Processor 40 may comprise one or more general purpose processors (e.g., INTEL processors) and/or one or more specialized processors (e.g., digital signal processors and/or application specific integrated circuits). And data storage 42 may comprise one or more volatile and/or non-volatile storage components, such as optical, magnetic, or organic storage components and may be integrated in whole or in part with processor 40.

As shown, data storage 42 may hold reference data 46 and program logic 48. The reference data may comprise performance metric data 50, throughput data 52, and target data 54.

The program logic 48 comprises machine language instructions executable by processor 40 to carry out various functions described herein. The program logic 48 may be executable to collect throughput data over time for each sector defined by the RAN (or within the cellular network). For example, if the entity in FIG. 2 is a BSC, program logic 48 may be executable to collect and record, for each sector served by the BSC, the sector's forward throughput by recording how much data per unit time passes through the BSC to mobile stations within the sector. Program logic 48 may then store the data in data storage 42. Alternatively, if the entity in FIG. 2 is a centralized server, program logic 48 may be executable to receive from another entity (such as a BSC) the throughput data, and store the data in data storage 42.

The program logic 48 is also executable to collect performance metric data over time for each sector defined by the RAN (or within the cellular network). By way of example, program logic 48 may be executable to collect and record data on the number of dropped connections within the sector. For example, if the entity in FIG. 2 is a BSC, the BSC may keep records of all mobile stations that have are communicating with RAN 12. If a mobile station ceases to communicate with the BSC for a predefined and/or unreasonably long period of time, the may identify the connection as a dropped connection, and store information relating to the dropped connection in data storage 42. Alternatively, if the entity in FIG. 2 is a centralized server, program logic 48 may be executable to receive from another entity (such as a BSC) the performance metric data, and store the data in data storage 42.

In addition, program logic 48 may be executable to calculate the performance data's average value over a specified amount of time, and store that value in data storage 42.

Program logic 48 may further be executable to (1) identify problem sectors, (2) apply the MLSE algorithm to each problem sector, (3) to calculate each sector's predicted improvement level, and (4) to prioritize problem sectors in order of predicted improvement levels. In addition, program logic 48 may be executable to generate a report listing, among other things, problem sectors and predicted improvement levels in order of predicted improvement levels. By prioritizing sectors in order of predicted improvement levels and generating a report in order of predicted improvement levels, maintenance teams can be dispatched to sectors whose repair would result in the greatest increase in throughput.

The performance metric data 50 comprises the values of one or more performance metrics collected over time for each sector defined by the RAN. A performance metric may be anything that might affect a sector's throughput. For example, a performance metric may include (1) the number of simultaneous primary connections within a sector, (2) the average amount of data transmitted to each mobile station within the sector, (3) a sector's reverse link throughput (e.g., the amount of data received from mobile stations within the sector), (4) the number of connection setup failures, or (5) the number of dropped connections. Many other types of performance metric data may be included in performance metric data 50 as well. Performance metric data 50 may include the values of performance metrics at specific points in time, or the average values of performance metrics over a specified period of time.

The throughput data 52 comprises the values of each sector's forward throughput. Forward throughput is the amount of digital data (physical or MAC layer) per time unit that is delivered to mobile stations within the sector. Throughput data 52 may include the sector's forward throughput at a specific point in time. In addition or alternatively, throughput data 52 may include the sector's average forward throughput over a specified amount of time.

The target data 54 comprises "optimal" throughput and performance metric values defined by the service provider (or any other entity that monitors sector performance). For example, target data 54 may include the sector's optimal throughput, and the optimal value of each collected performance metric. Target data 54 may be obtained from the service provider and updated periodically by the service provider.

Figure 3:
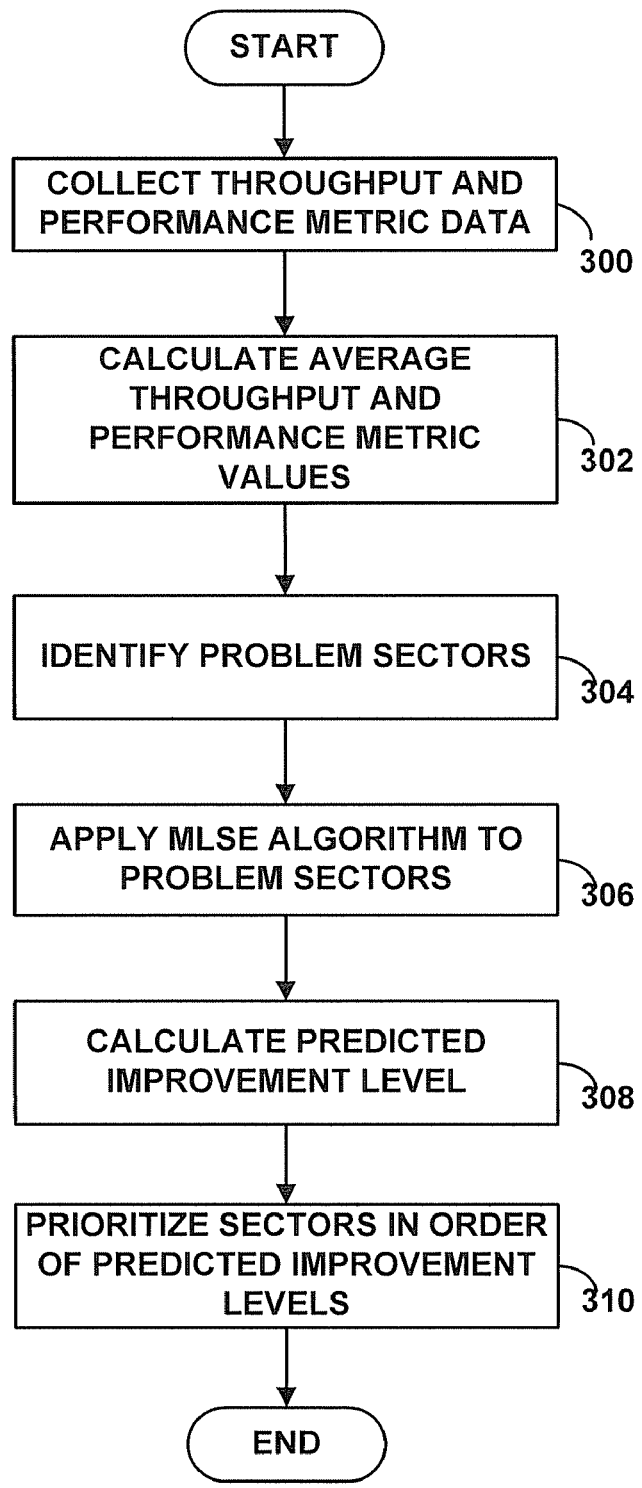
FIG. 3 is a flow chart depicting functions that can be carried out in accordance with the exemplary embodiment.

FIG. 3 is a flow chart depicting in summary a set of functions that can be carried out in accordance with the exemplary embodiment. As noted above, aspects of the method may be carried out at a BSC, MSC, centralized server, or some other entity.

As shown in FIG. 3, at step 300, throughput data and one or more performance metrics are collected for each sector over a specified amount of time (for instance, 8 days). Next, at step 302, the average total values, and the average daily (or some other amount of time) values are calculated for each performance metric and for the throughput. For instance, the BSC may collect the following performance metric data over eight days for Sector 17:

| Day | % Daily Connection Setup Failures ("CF") | % Daily Dropped Connections ("DC") | Average Daily Reverse Throughput ("RvsTpt") (Kbps) | Average Daily amount of data transmitted per mobile station ("TxData") (Megabytes) |
|---|---|---|---|---|
| 1 | 0.88 | 0.31 | 27.47 | 1.44 |
| 2 | 0.75 | 0.38 | 29.78 | 1.16 |
| 3 | 0.99 | 0.34 | 23.11 | 1.58 |
| 4 | 0.80 | 0.22 | 31.56 | 1.08 |
| 5 | 0.95 | 0.44 | 53.81 | 3.72 |
| 6 | 0.99 | 0.34 | 21.86 | 9.36 |
| 7 | 0.91 | 0.30 | 20.99 | 3.26 |
| 8 | 1.05 | 0.39 | 10.18 | 10.06 |
| 8 Day Avg. | 0.92 | 0.34 | 27.35 | 3.96 |

In addition, assume that the BSC may collect following throughput data for sector 17.

| Day | Daily Average Forward Throughput ("Throughput") |
|---|---|
| 1 | 859.42 |
| 2 | 624.04 |
| 3 | 629.65 |
| 4 | 625.30 |
| 5 | 803.23 |
| 6 | 925.74 |
| 7 | 689.86 |
| 8 | 874.17 |
| 8 Day Avg. | 753.93 |

At step 304, problem sectors are identified by calculating whether the average daily (or some other amount of time) value of each sector's performance metrics deviates above or below a specified target performance metric value for a specified amount of time. For example, assume that problem sectors include any sector having a daily dropped connection ("DC") rate greater than 0.25% for two days. In such a situation, sector 17 would be identified as a problem sector.

At step 306 the MSLE algorithm is applied to the problem sectors in order to determine the weights of each performance metric. Using the MSLE algorithm on example problem sector described above, for instance Throughput=$x_0+x_1$*CF+$x_2$*DC+$x_3$*RvsTpt+$x_4$*TxData, or $\vec{B}=A\vec{X}$.

In this case, the vector $$\vec{B} = \begin{bmatrix} 859.42 \\ 624.04 \\ 629.65 \\ 625.30 \\ 803.23 \\ 925.74 \\ 659.86 \\ 874.17 \end{bmatrix},$$

and the matrix $$A = \begin{bmatrix} 1 & .88 & .31 & 24.47 & 1.44 \\ 1 & .75 & .38 & 29.78 & 1.16 \\ 1 & .99 & .34 & 23.11 & 1.58 \\ 1 & .80 & .22 & 31.56 & 1.08 \\ 1 & .95 & .44 & 53.81 & 3.72 \\ 1 & .99 & .34 & 21.86 & 9.36 \\ 1 & .91 & .30 & 20.99 & 3.26 \\ 1 & 1.05 & .39 & 10.18 & 10.06 \end{bmatrix}$$

To calculate the weight values $\vec{X}$, $$\vec{X}=(A^T A)^{-1} A^T \vec{B}$$

where $A^T$ is the transpose of matrix A.

In this example, $$\vec{X} = \begin{bmatrix} 462.6479 \\ 164.9060 \\ -138.1484 \\ 2.8352 \\ 27.7527 \end{bmatrix}$$

At step 308, after calculating the values of $\vec{X}$, each sector's optimized throughput is calculated by using the eight day average values of the performance metrics and the calculated weights per metric in the equation Throughput=$x_0+x_1$*CF+$x_2$*DC+$x_3$*RvsTpt+$x_4$*TxData where the value of a specific performance metric is substituted with a specific target performance metric stored in target data 54. The sector's predicted improvement level is calculated by taking the difference in sector's optimized and actual throughput, and dividing the difference by the sector's actual throughput.

Continuing the example above, the sector's predicted improvement level is calculated by substituting the sector's problem metric (in this example, a DC value of 0.34) with the target metric DC value of 0.25. Using this value, the optimized throughput is 767.18 Kbps. The sector's predicted improvement level is calculated by taking the difference in sector's optimized throughput and the sector's eight-day average throughput ("actual throughput"), and dividing the difference by the sector's actual throughput. The sector's predicted improvement level is (767.18−753.93)/753.93=1.76%

Finally, at step 310, the problem sectors are prioritized in order of throughput improvement. A service provider may now schedule maintenance teams to repair sectors in order of throughput improvement. For example, assume that in addition to the 1.76% predicted improvement to sector 17, there is a 0.21% predicted improvement to sector 19. In such a situation, maintenance teams would be sent to repair sector 17 before sector 19, because repairing sector 17 would result in a greater throughput increase than repairing sector 19.

Prioritizing sector repair by predicted improvement level is advantageous because it enables maintenance teams to focus their efforts on sectors that would benefit most from repair. Additionally, by targeting a specific problem metric, maintenance teams can focus their repairs on elements within the network that affect that metric. Moreover, repairing sectors in order of throughput improvement will help generate customer goodwill towards the service provider, as the customers will most likely notice the sector's throughput improvement.

Figure 4:
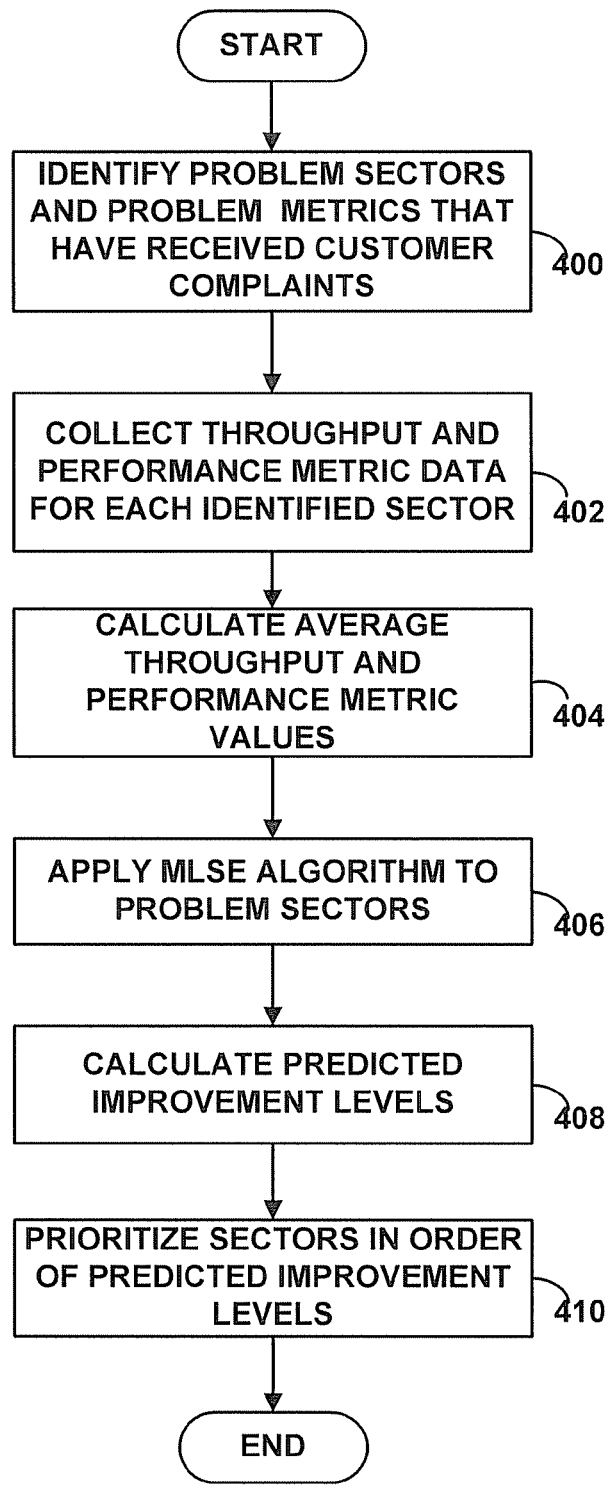
FIG. 4 is a flow chart depicting functions that can be carried out in accordance with an alternate embodiment.

FIG. 4 is a flow chart depicting in summary a set of functions that can be carried out in accordance with an alternate embodiment. As noted above, aspects of the method may be carried out at a BSC, MSC, centralized server, or some other entity.

The alternate embodiment identifies problem sectors and metrics through customer complaints. Next, the MSLE algorithm is applied on those sectors and metrics identified by customers. As shown in FIG. 4, at step 400, problem sectors and problem metrics that have received a threshold number of customer complaints are identified. For example, if a threshold number of customers complain that they experience an increased number of dropped calls in a specific sector, that sector is identified as a problem sector having a problem metric related to dropped connections. At step 402, throughput data and one or more performance metrics (including the problem metrics identified by customer complaints) are collected for each sector for a specified amount of time. Next, at step 404, the average values are calculated for each performance metric and for the throughput. At step 406 the MSLE algorithm is applied, as in the above example, to the problem sectors so as to determine the weights of each performance metric.

At step 408, after calculating the weight values, each sector's throughput improvement is calculated by substituting the value of the identified problem metric with a specific target performance metric stored in target data 54. The sector's predicted improvement level is calculated by taking the difference in sector's optimized and actual throughput, and dividing the difference by the sector's actual throughput. Finally, at step 410, the problem sectors are prioritized in order of predicted improvement level. Thus, sectors with customer complaints and the greatest throughput improvement may be repaired first.

Embodiments of the invention have been described above. Those of ordinary skill in the art will appreciate, however, that modifications may be made while remaining within the scope of the invention as defined by the claims.

We claim:

1. A method for prioritizing the optimization of a plurality of sectors in a cellular network, wherein the method is carried out by a radio access network (RAN) entity, the method comprising:
    for each given sector of the plurality of sectors, the RAN entity collecting data representing a throughput of the given sector;
    for each given sector of the plurality of sectors, the RAN entity collecting one or more performance metrics for the given sector;
    for each given sector of the plurality of sectors, the RAN entity identifying whether the given sector is a problem sector by determining whether the given sector includes a problem metric, wherein determining whether the given sector includes a problem metric comprises comparing a performance metric to a target metric and determining whether the performance metric deviates from the target metric;
    for each identified problem sector, the RAN entity calculating a weight for each performance metric of the problem sector by applying a minimum least squares error algorithm;
    for each identified problem sector, the RAN entity calculating an optimized throughput value by substituting a value of the problem metric with a specified target value;
    for each identified problem sector, the RAN entity calculating an extent to which the problem sector's optimized throughput value improves over the problem sector's throughput;
    the RAN entity prioritizing identified problem sectors in order of the calculated extents to which each problem sector's optimized throughput value improves over the throughput; and
    the RAN entity using the prioritized data to schedule maintenance improvements of the problem sectors.

2. The method of claim 1, further comprising:
    determining whether the performance metric deviates from the target metric for a specified period of time.

3. The method of claim 1, wherein one of the performance metrics is a number of connection failures within the given sector.

4. The method of claim 1, wherein one of the performance metrics is a number of dropped connections.

5. A system comprising:
a communication interface;
a processing unit;
data storage; and
program logic stored in the data storage and executable by the processing unit to (i) for each given sector of a plurality of sectors, collect data representing a throughput of the given sector, (ii) for each given sector of the plurality of sectors, collect one or more performance metrics for the given sector, (iii) for each given sector of the plurality of sectors, identify whether the given sector is a problem sector by determining whether the given sector includes a problem metric, wherein determining whether the given sector includes a problem metric comprises comparing a performance metric to a target metric and determining whether the performance metric deviates from the problem metric, (iv) for each identified problem sector, calculate a weight for each performance metric of the problem sector by applying a minimum least squares error algorithm, (v) for each identified problem sector, calculate an optimized throughput value by substituting a value of the problem metric with a specified target value, (vi) for each identified problem sector, calculate an extent to which the problem sector's optimized throughput value improves over the problem sector's throughput, (vii) prioritize the identified problem sectors in order of the calculated extents to which each problem sector's optimized throughput value improves over the throughput and (viii) generate a report listing the identified problem sectors in order of predicted improvement levels.

6. The system of claim 5, wherein the specified target value is obtained by a service provider.

7. The system of claim 5, wherein the program logic is further arranged to receive data representing the throughput of the given sector.

8. The system of claim 5, wherein the program logic is further arranged to receive data representing one or more performance metrics of the given sector.

9. A method for prioritizing the optimization of a plurality of sectors in a cellular network, wherein the method is carried out by a radio access network (RAN) entity, the method comprising:
for each given sector of the plurality of sectors, the RAN entity collecting data representing a throughput of the given sector;
for each given sector of the plurality of sectors, the RAN entity collecting one or more performance metrics for the given sector;
for each given sector of the plurality of sectors, the RAN entity identifying whether the given sector is a problem sector by obtaining a specified number of customer complaints about the given sector;
for each identified problem sector, the RAN entity identifying a problem metric within the problem sector, wherein identifying a problem metric within the problem sector comprises comparing a performance metric to a target metric and determining whether the performance metric deviates from the target metric;
for each identified problem sector, the RAN entity calculating a weight for each performance metric of the problem sector by applying a minimum least squares error algorithm;
for each identified problem sector, the RAN entity calculating an optimized throughput value by substituting a value of the problem metric with a specified target value;
for each identified problem sector, the RAN entity calculating an extent to which the problem sector's optimized throughput value improves over the problem sector's throughput;
the RAN entity prioritizing identified problem sectors in order of the calculated extents to which each problem sector's optimized throughput value improves over the throughput; and
the RAN entity using the prioritized data to schedule maintenance improvements of the problem sectors.

10. The method of claim 9, wherein identifying a problem metric within the problem sector comprises obtaining a specified number of customer complaints about a metric.

11. The method of claim 9, wherein the identified problem metric is a number of dropped connections in the problem sector.

12. The method of claim 9, wherein the identified problem metric is a number of connection failures within the problem sector.

13. The method of claim 1, further comprising:
performing the maintenance improvements according to the schedule.

14. The method of claim 9, further comprising:
performing the maintenance improvements according to the schedule.

15. The method of claim 1, wherein one of the performance metrics is an average daily amount of data transmitted per mobile station.

16. The method of claim 9, wherein one of the performance metrics is an average daily amount of data transmitted per mobile station.

* * * * *